J. GRIMES.
AUTOMATIC WEIGHING AND SACK FILLING APPARATUS.
APPLICATION FILED DEC. 20, 1915.

1,201,173.  Patented Oct. 10, 1916.

Inventor:
Josiah Grimes
by Arthur P. Knight
Atty.

UNITED STATES PATENT OFFICE.

JOSIAH GRIMES, OF ALHAMBRA, CALIFORNIA.

AUTOMATIC WEIGHING AND SACK-FILLING APPARATUS.

1,201,173.  Specification of Letters Patent.  Patented Oct. 10, 1916.

Application filed December 20, 1915. Serial No. 67,784.

*To all whom it may concern:*

Be it known that I, JOSIAH GRIMES, a citizen of the United States, residing at Alhambra, in the county of Los Angeles and State of California, have invented a new and useful Automatic Weighing and Sack-Filling Apparatus, of which the following is a specification.

This invention relates to means for automatically weighing out quantities or packages of sugar, meal, or other material, in such manner that the weight delivered will be automatically checked to a predetermined amount, and errors arising from carelessness of the weighing operator will be avoided.

The main object of the present invention is to provide improved means for supplying the automatic weighing means with the material to be weighed, and to provide for adjustment of the relative position of the weighing means and the supply means therefor, for filling different sizes of packages.

Another object of the invention is to facilitate the use of the weighing means, either in connection with the automatic supply means, or as an ordinary direct weighing scales.

A further object of the invention is to provide a weighing apparatus adapted to knock down into small compass.

Figure 1:
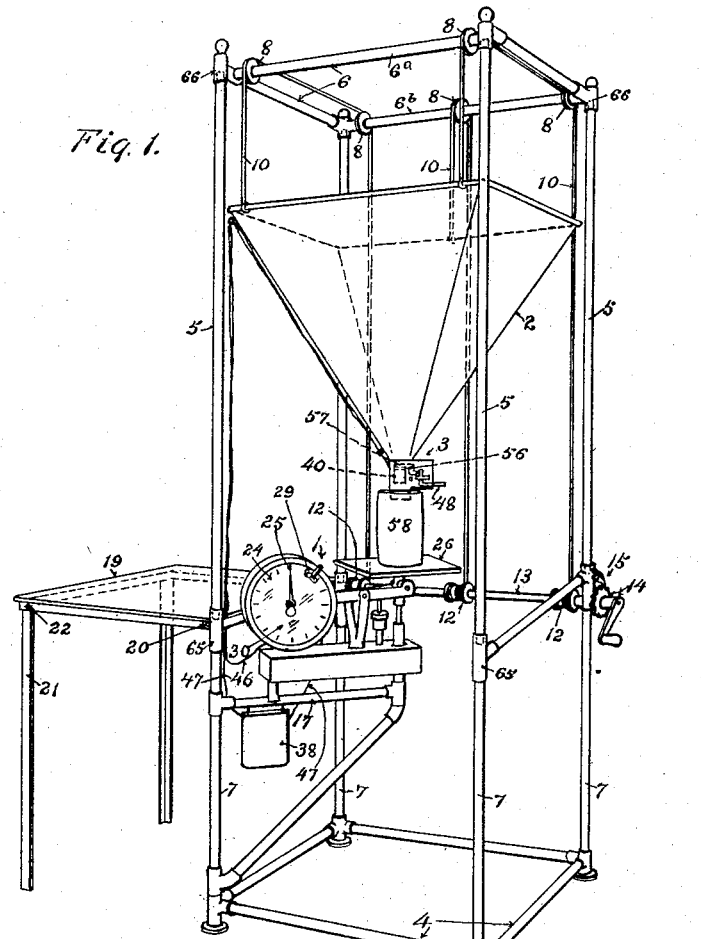
Figure 2:
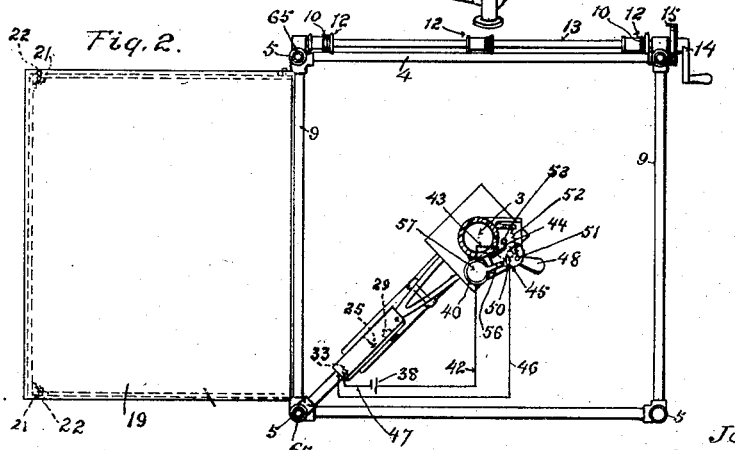
Figure 3:
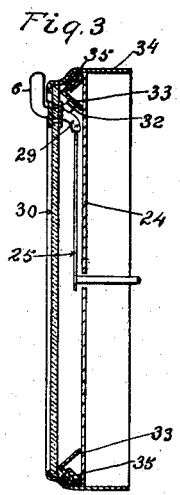

The accompanying drawing illustrates an embodiment of my invention, and referring thereto: Figure 1 is a perspective view of the apparatus. Fig. 2 is a horizontal section thereof, showing the circuit connections. Fig. 3 is a vertical section of the dial for the scales.

The apparatus comprises a weighing scales 1, a bin or hopper 2 for supplying material thereto, means for supporting said bin or hopper at any desired height relatively to the scales, and gate means 3 for controlling the supply of material from the bin to the scales. The bin or hopper is supported by a frame comprising a base member having a bottom frame 4 and vertical bars 7, connected by cross bars 9, and an upper member formed of vertical bars 5, mounted on the bars 7 of the base member and connected at their upper ends to a frame 6. Pulleys 8 are rotatably mounted on bars 6$^a$ and 6$^b$ of frame 6, and cables, wires or chains 10 run over said pulleys, one end of each cable being connected to the bin 2, and the other end of the respective cables being connected to drums 12 on a shaft 13 mounted in bearings on vertical bars 7 of the base member, and operated by a windlass or winch 14, having pawl and ratchet detent means 15. By turning said winch all of the cables are operated simultaneously to raise and lower the bin without tipping. Bin 2 preferably tapers toward its lower end, where it is provided with the gate 3. Vertical bars 5 of the frame are removably seated in sleeves 65 and 66, respectively on the base member bars 7 and on the top frame member 6, so as to enable the said bars 5 to be removed when it is desired to collapse the apparatus.

The scales 1 are mounted on an arm or bracket 17 adapted to turn around one of the vertical bars 7 of the base member, so that the platform 26 of said scales may be brought into position beneath the gate 3, or the scales may be swung out of the base member, either to allow the bin to be lowered for filling, or to enable the scales to be used for weighing by hand. Scales 1 may be provided with a direct reading dial 24 and with a pointer 25 operated by the platform 26 in usual manner.

A table 19 may be mounted on the base member, by pivots or hinges 20, supported by sleeves 65, in such manner that the table may be extended out at one side of the frame, or may be swung down alongside the frame, said table having outer legs 21 which are pivoted thereto at 22 so as to enable them to fold up sufficiently to swing in between the vertical bars 7 of the base member, when the table is swung down as stated.

The feed gate may be of the construction shown in my patent No. 1126756, issued Feb. 2, 1915, and is controlled by an electromagnet indicated at 40 in Fig. 2. Any suitable means for controlling the operation of this magnet responsively to the weight on the scales, may be used, but I prefer to use a direct reading scales as shown, and to provide the same with circuit controlling means as shown in Figs. 1 and 3, comprising a contact 29 mounted on the glass front 30 of the dial 24, and provided with a handle 36 for turning the glass front and contact around the axis of the pointer 25, and with a brush 32 sliding on a metal ring 33 which is mounted within the dial rim 34 and is insulated by insulating material 35. The end portion of pointer 25, which coöperates with said contact 29 is preferably made as a light leaf spring.

A battery 38, which may be mounted on the bracket 17, is connected by wire 42 to electromagnet 40, whence a wire 43 leads to a contact spring 44, which is adapted, when the gate 3 is opened, by its handle 48, to close circuit with a contact means 45, connected through the metal parts, or by a wire 46, with the casing of the scales. The pointer of the scales, which is in metallic connection with the casing, is adapted, when the required weight is delivered to the sack on the platform, to contact with the contact 29, connected with ring 33 by brush 32 and said ring is connected by wire 47 with the other side of battery 38. In the form of the invention shown, the contact means 45 is formed as a plate carried by the shaft 50 of the gate 3, said plate being formed with a projecting portion adapted to contact with the contact means 44, and said plate carrying a pin 51 to which is connected the spring 52 for closing the gate, said spring being connected to a support formed as an adjustable screw, which may be so adjusted that, in passing to open position, the spring just passes dead center. Stop means 53 is provided for the plate 45, and the pin 51 on said plate is so placed that when the gate is open, said pin will be in position to be pushed by a lever 56 for the armature 57 of electromagnet 40, so as to move spring 52 back over the dead center, and permit it to restore the gate to closed position.

To fill the bin 2, the bracket 17 with the scales thereon, is swung out of the way, and the bin is lowered by the winch until it is low enough for convenient filling. When filled, it is raised by operation of the winch until the gate 3 is at proper height for delivery into the size of sacks that are to be filled, when such sacks are placed on the platform of the scales. The scales are then brought into position, with the platform beneath the gate by swinging back the bracket 17, and the table 19 being extended at the side of the frame, the apparatus is ready for use.

A sack 58 being placed on the scale platform 26, beneath the gate 3, said gate is opened by its handle 48, and material runs from the bin into the sack until the weight, as determined by the setting of the contact 29 in the scales, is delivered, when the pointer 25 closes circuit (a connection having already been made at 44, 45, by opening of the gate) whereby the electromagnet 40 is energized, and the gate is tripped and is closed by its spring 52. The sack may then be placed on table 19 and replaced by another.

If at any time it is desired to use the scales for ordinary weighing, the bracket 17 may be swung around to bring the scales outside of the frame, and alongside of the table 19. To collapse the apparatus for storage or shipment, the top frame 6 is lifted off, the bars 5 are withdrawn from sleeves 65, and the top then placed on the base member, the bracket 17 being swung to one side, and the scales suitably packed.

What I claim is:

1. A weighing apparatus comprising a frame, a supply bin mounted to move vertically therein and provided with a gate, means for raising and lowering said bin, a weighing scales, and an arm carrying said scales and mounted to swing on said frame to bring said scales into position beneath said gate or to bring said scales into position at one side of said frame.

2. A weighing apparatus comprising vertical frame bars, top and bottom frames connecting said bars, pulleys mounted on said top frame, cables running on said pulleys, winch means connected to said cables, a bin suspended by said cables and adapted to move vertically within said vertical bars, and scales mounted on one of said vertical bars and extending beneath said bin, said bin having a gate for delivery of material to said scales.

3. A weighing apparatus comprising vertical frame bars, top and bottom frames connecting said bars, a bin movably suspended from said top frame to move vertically between said vertical bars and provided with a gate at its bottom, means for raising and lowering said bin, a bracket mounted to swing on one of said vertical bars, and a scales mounted on said bracket to be moved thereby into position beneath the said gate, or into position outside of the space between the said vertical frame bars.

4. In a weighing apparatus, a direct reading scales provided with a dial, a pointer reading thereon, and a glass front, an insulated conducting ring mounted back of said glass front, contact means mounted on said glass front and rotatable therewith around the axis of rotation of the said pointer, a brush connected to said contact means and making traveling contact with said insulating conducting ring, and electric circuit means connected to said pointer and to said insulated conducting ring.

In testimony whereof I have hereunto set my hand, at Los Angeles, California, this 8th day of December 1915.

JOSIAH GRIMES.